United States Patent Office 3,368,346
Patented Feb. 13, 1968

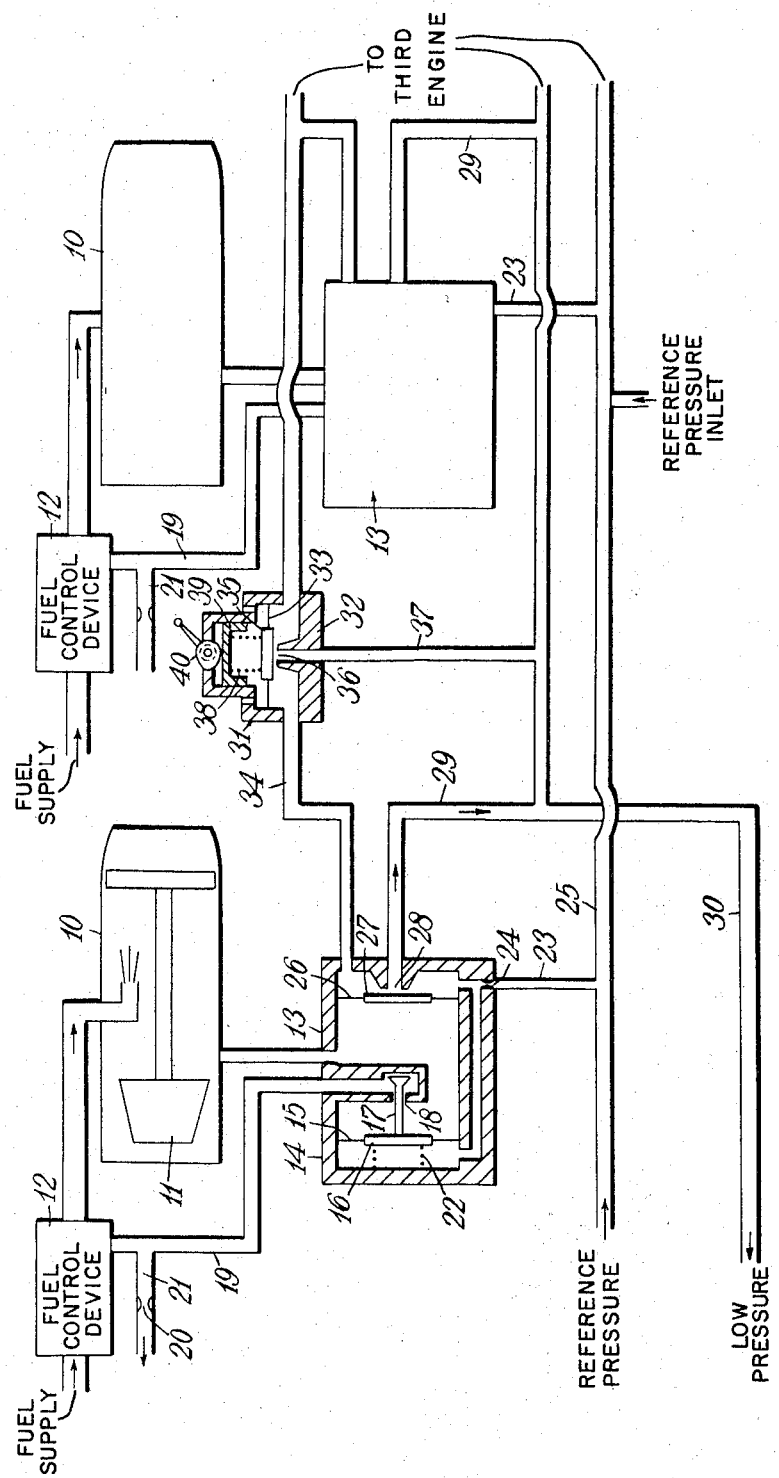

3,368,346
SYNCHRONISING CONTROL MEANS FOR MULTIPLE GAS TURBINE ENGINE INSTALLATIONS
Eugene Harold Warne, Solihull, England, assignor to Joseph Lucas (Industries) Limited, Birmingham, England, a British company
Filed June 21, 1966, Ser. No. 559,224
2 Claims. (Cl. 60—39.15)

This invention relates to installations including a plurality of gas turbine engines arranged to perform work upon a common load, and it relates specifically to control means for matching the outputs of the engines. In such an installation, the engines are provided with individual power control devices which are responsive to changes in the pressures of air leaving the respective engine compressors. Such installations will for convenience be referred to as being of the kind specified.

In installations of the kind specified, it is not infrequently found that acceleration or deceleration rates of the engines differ from one another and this will of course mean that an engine with a greater acceleration or deceleration rate will absorb a greater proportion of the total load than the or all of the other engines in the installation. In the special case of a plurality of gas turbine engines discharging into a common plenum chamber, there is the danger that if the pressure is lower in the exhaust outlet of one engine than exists in the plenum chamber, that engine will tend to stall by creation of a back pressure at the turbine with consequential damage to that engine.

It is the object of this invention to provide control means for installations of the kind specified whereby the engine outputs can be matched so that no engine takes a substantially greater share of the load, in proportion, to its capacity, than any other.

According to the present invention, a control means for an installation of the kind specified comprises a plurality of valve means associated with the engines respectively, each of said valve means being arranged to modify the response of the power control device to the compressor pressure of the respective engine, in accordance with the difference between the respective compressor pressures and a fluid pressure to which all the valve means in the installation are subjected, the arrangement being such that a change in the difference between said fluid pressure and one of the compressor pressures will tend to result in a change in said fluid pressure itself, thus altering the difference between this fluid pressure and the compressor pressure at the or all of the other engines in such a manner that the or all of the other engines will tend to have its or their speeds or powers altered, thus substantially equalising the compressor pressure of all of the engines.

A specific example of the invention will now be described with reference to the accompanying drawing, which is a diagrammatic representation of an installation incorporating the present invention.

In this example, the installation comprises two or more gas turbine engines 10 each having a compressor indicated at 11, and fuel supply means incorporating a power control device which in this example, takes the form of a fuel/air ratio control device 12 which is responsive to the pressure of air leaving the compressor 11 (referred to as compressor pressure), this being a convenient parameter for altering the fuel flow in accordance with engine speed changes. For each engine, the compressor pressure reaches the control device 12 through a valve means indicated generally by 13. This valve means 13 comprises a body 14 in which is provided a first diaphragm 15. A disc 16 supported by the diaphragm 15 carries a headed valve member 17 arranged to control the flow of air through an orifice 18 in communication with a passage 19 of the fuel/air ratio control device 12. This passage 19, however, is in communication with the atmosphere through a restrictor 20 in a passage 21, the restrictor 20 and the orifice 18 constituting the fixed and variable elements of an air potentiometer which thus provides a signal which is related to compressor pressure for altering the fuel flow and thus the speed of the engine.

Whilst one side of the diaphragm 15, to which the valve member 17 is attached, is subjected to compressor pressure, the other side is subjected to a fluid pressure which is derived from a pump (not shown) driven by the engine 10, one such pump being driven by each engine 10 respectively. This fluid pressure acts upon the diaphragm 15 in the same direction as a light spring 22 and is supplied through a pipe 23 having a restrictor 24 and this pipe 23 communicates with a pipe 25 connected to all the pipes 23 in the installation.

Each valve means 13 has a second diaphragm 26 one side of which is subjected to compressor pressure whilst the other side is subjected to said fluid pressure. A disc 27 carried by the diaphragm 26 can close an orifice 28 communicating with a passage 29 which itself communicates with a pipe 30 to a reservoir (not shown) which is common to all the passages 29 in the installation.

In use, the valve means 13 serve to synchronise the speeds of the engine in the following manner. During acceleration conditions, the characteristics of the individual engines 10 may result in one engine accelerating at a greater speed than the other or others. The compressor pressure of the engine with the slowest rate of acceleration will fall below the value of the fluid pressure in the installation and the disc 27 will uncover the orifice 28 thus lowering the pressure of the fluid in a passage 34. At the same time, the valve member 17 will tend to move to permit increasing flow of air to the fuel/air ratio control device to cause an increase in fuel to increase engine speed.

From a decrease in fluid pressure in the passage 34 will follow a general decrease in the fluid pressure throughout the installation. This will have the effect of maintaining the disc 27 in positions substantially to close the orifices 28 in all the valve means 13 except that of the slowest accelerating engine 10, and at the same time tending to close the orifices 18 by movement of the valve member 17 in response to a change in the pressure difference across the first diaphragm 15. A reverse sequence of events occurs during deceleration conditions if one engine decelerates at a solwer rate than the other or others. Synchronism during steady running conditions can be maintained in a similar manner, should one engine speed up or slow down with respect to the other or others.

Acceleration, deceleration and steady running conditions are selected by a device indicated at 31 which comprises a body 32 containing a diaphragm 33 to one side of which the fluid pressure is admitted from the valve means 13 through the passage 34. The diaphragm carries a disc 35 which can close an orifice 36 communicating with the pipe 30 to the reservoir through a pipe 37. The diaphragm 33 is loaded by a spring 38 the rating of which is controlled by the position of a piston 39 which is under the control of a cam 40.

It will be noted that there is only one device 31 in the installation and for acceleration conditions, the spring 38 is positioned by the piston 39 to permit flow to take place through the orifice 36 at a rate such that the orifice 28 in the respective valve means 13 are closed, unless of course one of the compressor pressures is lower than the others.

Deceleration conditions occur when the orifice 36 is opened so that the pressure on the diaphragm 15 causes the orifice 18 to move towards a closed position.

Steady running conditions can be maintained by achieving with the device 31, a balance of loads on the opposite sides of the diaphragm 15 of the respective valve means 13, so that the signal received by the fuel/air ratio control devices 12 provides for steady running of the respective engines 10.

Having thus described my invention what I claim as new and desire to secure by Letters Patent is:

1. A control means for an installation comprising a plurality of gas turbine engines, arranged to perform work upon a common load, a plurality of power control devices associated with the engines respectively, said power control devices being responsive to changes in the pressures of air leaving compressors in the respective engines, to control the supply of fuel to the engines respectively, said control means comprising a plurality of valve means associated with the engines respectively, said valve means being responsive to changes in the associated engine compressor pressure to modify the response of the power control devices to the compressor pressures of the engines respectively, and a variable control valve arranged to set the value of a reference pressure applied to all said valve means, any change in any compressor pressure varying said reference pressure with the associated valve means, and this change in the reference pressure being applied to all the valve means to provide respective modifying signals to said power control devices, to vary the supply of fuel to the engines until the compressor pressures become equalised.

2. A control means as claimed in claim 1 in which the valve means each comprises a body having an interior chamber to which air at compressor pressure is admitted, a valve within the body controlling the escape of air at said compressor pressure through passage means to the associated engine power control device, and means responsive to said reference pressure and acting on said valve to control the flow of air therethrough, and further means within the body responsive to the compressor pressure, to vary the reference pressure.

References Cited

UNITED STATES PATENTS 3,159,000 12/1964 McCombs _____ 60—39.15
3,234,740 2/1966 Moore _____ 60—39.15 X JULIUS E. WEST, *Primary Examiner.*